US009781271B2

(12) United States Patent
Anderson

(10) Patent No.: US 9,781,271 B2
(45) Date of Patent: *Oct. 3, 2017

(54) AUTOMATIC MESSAGE MANAGEMENT UTILIZING SPEECH ANALYTICS

(71) Applicant: Nuance Communications, Inc., Burlington, MA (US)

(72) Inventor: David J. Anderson, Lawrenceville, GA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,871

(22) Filed: Apr. 20, 2015

(65) Prior Publication Data

US 2015/0229769 A1    Aug. 13, 2015

Related U.S. Application Data

(63) Continuation of application No. 13/554,545, filed on Jul. 20, 2012, now Pat. No. 9,014,348, which is a continuation of application No. 11/888,074, filed on Jul. 31, 2007, now Pat. No. 8,229,085.

(51) Int. Cl.
*H04M 1/64* (2006.01)
*H04M 3/53* (2006.01)
*G06F 17/27* (2006.01)
*H04M 3/533* (2006.01)

(52) U.S. Cl.
CPC ........ *H04M 3/5307* (2013.01); *G06F 17/279* (2013.01); *H04M 1/64* (2013.01); *H04M 3/53333* (2013.01)

(58) Field of Classification Search
CPC .. H04M 3/5307; H04M 1/64; H04M 3/53333; G06F 17/279
See application file for complete search history.

(56) References Cited

U.S. PATENT DOCUMENTS

| 5,153,905 A | 10/1992 | Bergeron et al. |
| 5,802,466 A | 9/1998 | Gallant et al. |
| 6,240,294 B1 * | 5/2001 | Hamilton ............... H04W 60/00 455/456.3 |

(Continued)

*Primary Examiner* — Simon King

(57) ABSTRACT

Embodiments are provided for utilizing speech analytics for automatically managing messages in a communications network. A message from a calling party to an unavailable called party is recorded in a messaging management module. The messaging management module automatically identifies a category for assigning to the content of the message based on information associated with the unavailable called party or a calling party and associates a language model with the message content based on the category. An analysis module utilizes the language model to identify grammar making up the message content. The messaging management module automatically performs a messaging management function on the message content based on a set of rules. The messaging management function may include automatically determining a priority for the message (enabling the message to be retrieved out of order) or automatically triggering an action in response to the message which is directed to the unavailable called party.

20 Claims, 3 Drawing Sheets

(56) References Cited

U.S. PATENT DOCUMENTS

| | | | |
|---|---|---|---|
| 6,606,373 B1* | 8/2003 | Martin | H04M 3/5307 |
| | | | 379/88.01 |
| 7,487,094 B1* | 2/2009 | Konig | G10L 15/19 |
| | | | 379/88.01 |
| 7,515,903 B1* | 4/2009 | Cast | H04L 51/066 |
| | | | 455/413 |
| 2005/0248437 A1* | 11/2005 | Hellebust | H04M 19/041 |
| | | | 340/7.51 |
| 2006/0148504 A1* | 7/2006 | Kim | H04W 76/005 |
| | | | 455/518 |
| 2008/0005226 A1 | 1/2008 | Subbian | |
| 2009/0103692 A1 | 4/2009 | Burg et al. | |

* cited by examiner

AUTOMATIC MESSAGE MANAGEMENT UTILIZING SPEECH ANALYTICS

PRIORITY INFORMATION

The present application is a continuation of U.S. patent application Ser. No. 13/554,545, filed Jul. 20, 2012, which is a continuation of U.S. patent application Ser. No. 11/888,074, filed Jul. 31, 2007, now U.S. Pat. No. 8,229,085, issued Jul. 24, 2012, which content is incorporated herein by reference in its entirety.

BACKGROUND OF THE INVENTION

In communication networks, voice messaging services provide subscribers with a recording of missed calls as well as call information which may be utilized to preview saved messages or later search for specific messages in a network voicemail box. In addition to "audio only" voice messaging services, which provide users with a message waiting light as a visual alert of received messages, multimodal (i.e., audio and visual) voice messaging services provide subscribers with a visual alert graphic or icon in addition to the visual delivery of caller identification, time called, and length of call information associated with the calling party leaving the message.

Current voice messaging service, however, suffer from a number of drawbacks. For example, one drawback associated with audio only voice messaging services is that they require subscribers to listen to each call in the order received. Furthermore, subscribers to both audio only and multimodal messaging services must listen to each call to understand the content of the message and manually take action after reviewing or listening to each call. Thus, if a number of calls are received, they all must be reviewed regardless of their importance to the called party. Another drawback associated with current voice messaging services is that messages stored in a database can only be queried by caller name, phone number, or a keyword manually annotated to the message when it is reviewed.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Embodiments are provided for utilizing speech analytics for automatically managing messages in a communications network. In one embodiment, a message from a calling party to an unavailable called party is recorded in a messaging management module. The messaging management module automatically identifies a category for assigning to the content of the message based on information associated with the unavailable called party or the calling party and associates a language model with the message content based on the identified category. An analysis module utilizes the language module to identify grammar comprising the message content. The messaging management module then automatically performs a messaging management function with respect to the message content based on a set of rules. The messaging management function may include automatically determining a priority for the message (enabling the message to be retrieved out of order), refining the category or automatically triggering an action in response to the message which may be immediately directed to the unavailable called party.

These and other features and advantages will be or become apparent to one with skill in the art upon review of the following drawings and detailed description. It is intended that all such features and advantages be included within this description, be within the scope of the present invention, and be protected by the accompanying claims. It is to be understood that both the foregoing general description and the following detailed description are illustrative only and are not restrictive of the invention as claimed.

DETAILED DESCRIPTION

Figure 1:
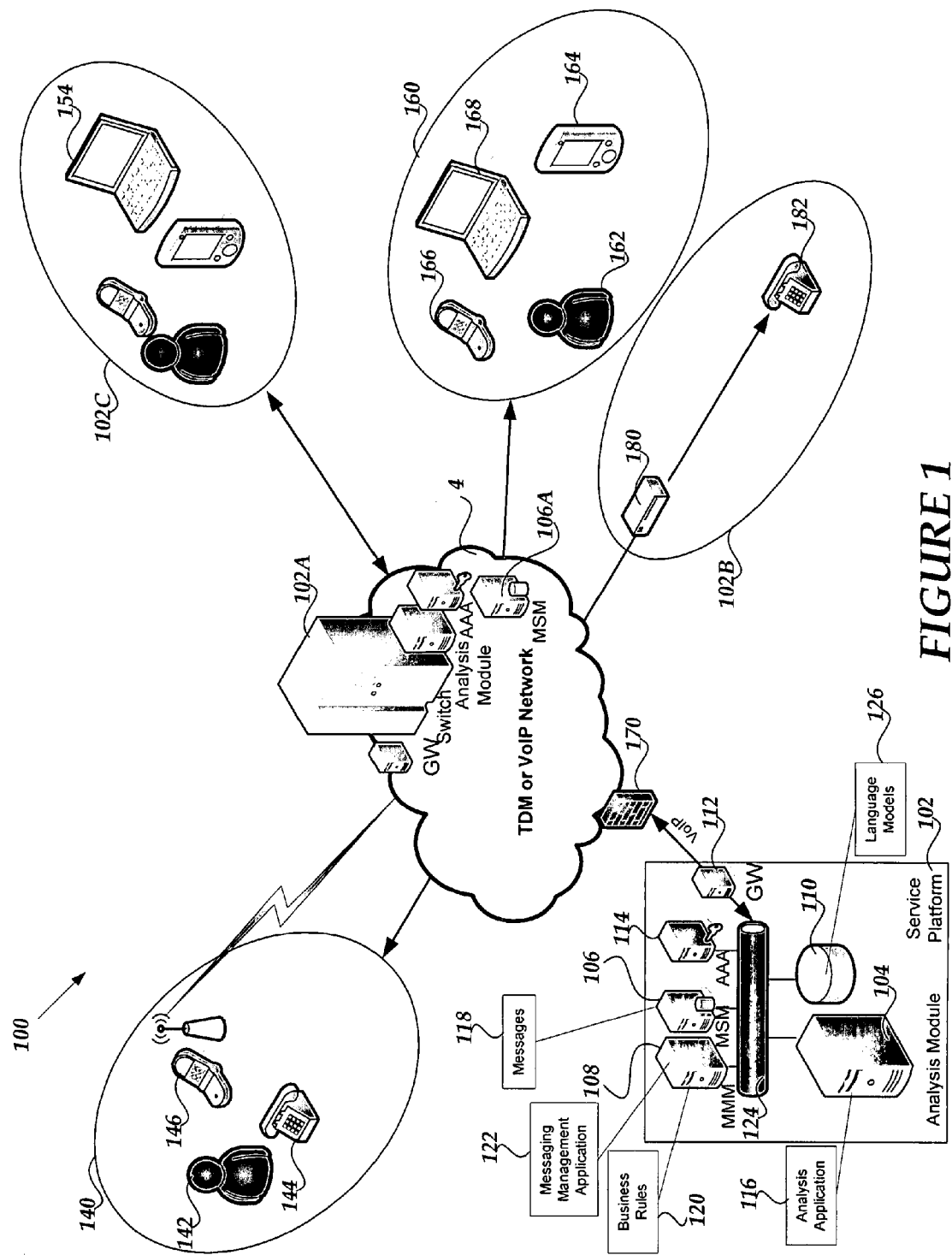
FIG. 1 is a network architecture diagram illustrating aspects of network devices utilized in and provided by various embodiments of the invention.

Embodiments are provided for utilizing speech analytics for automatically managing messages in a communications network. In one embodiment, a message from a calling party to an unavailable called party is recorded in a messaging management module. The messaging management module automatically identifies a category for assigning to the content of the message based on information associated with the unavailable called party or the calling party and associates a language model with the message content based on the identified category. An analysis module utilizes the language model to identify grammar comprising the message content. The messaging management module then automatically performs a messaging management function with respect to the message content based on a set of rules. The messaging management function may include automatically determining a priority for the message (enabling the message to be retrieved out of order), refining the identified category or automatically triggering an action in response to the message which is directed to the unavailable called party or its representative.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Referring now to the drawings, in which like numerals represent like elements through the several figures, various aspects of the present invention and an illustrative network environment will be described. In particular, FIG. 1 and the corresponding discussion are intended to provide a brief, general description of a suitable network in which the invention may be implemented.

Embodiments of the invention may be implemented as a computer process, a computing device, or as an article of manufacture, such as a computer program product or computer-readable media. The computer program product may be a computer storage media readable by a computer system and encoding a computer program of instructions for executing a computer process. The computer program may also be a propagated signal on a carrier readable by a computing system and encoding a computer program of instructions for executing a computer process.

Referring now to FIG. 1, an illustrative network environment 100 for the several embodiments, utilizing the techniques described herein, will be described. As shown in FIG. 1, the network environment 100 may comprise a communications network including a Service Platform 102. The Service Platform 102 is in communication with a calling party location 140 and a called party location 160 over a network 4. The calling party location 140 may include, without limitation, a calling party 142, a landline telephone 144, and/or a wireless telephone 146 while the called party location 160 may include, without limitation, a called party 162, a Personal Digital Assistant ("PDA") or "smartphone" 164, a wireless or cordless telephone 166, and/or personal computer 168. It should be appreciated by those skilled in the art that the PDA or smartphone 164 may comprise a mobile or wireless telephone phone with features typically available on a personal computer system such an operating system, and a processor and a memory for executing and storing various application programs, Internet access (including sending and receiving electronic mail ("email")), and a graphics-capable display.

In accordance with one embodiment, the network 4 may comprise a circuit switched network, such as the conventional public switched telephone network ("PSTN"), utilizing time division multiplexing ("TDM") for communicating voice and data between wireline and wireless communication devices. In accordance with an alternative embodiment, the network 4 may comprise a wide area packet switched computing network, such as the Internet, for communicating voice and data utilizing, for example, Voice over Internet Protocol ("VOIP"). Those skilled in the art should appreciate that communication between the network 4 and the Service Platform 102, the calling party location 140 and the called party location 160 may be facilitated by TDM or VoIP communication links which may include, but are not limited to two-wire and four-wire copper telephone lines (including digital subscriber lines ("DSL")), coaxial cable lines, wireless communication links (including Wi-Fi), and the like. The Service Platform 102 may connect to the network 4 as a bridged connection to a point-to-point TDM or VoIP call (e.g., a call from the calling party location 140 to the called party location 160) to provide voicemail functionality or alternatively to an existing voicemail platform to capture or utilize created voice messages left for an unavailable called party. It should be understood by those skilled in the art that the messages recorded on the Service Platform 102 may be accomplished utilizing a number of standards and formats including, but not limited to, the G.711, G.729, GSM, and VOX.

In accordance with one embodiment, the Service Platform 102 may be configured to communicate with the network 4 through a firewall 170 and may comprise various modules and databases for receiving, recording, and processing communications between the calling party station 140 and the called party station 160 in real-time. Each module may comprise, without limitation, a server, general purpose desktop, laptop, handheld, tablet, or other type of computer having at least a central processing unit, a system memory, storage capable of storing one or more application programs and other data. It should be understood that the storage may include computer-readable media such as a hard disk or CD-ROM drive, or any other available media that can be accessed or utilized by a computer. By way of example, and not limitation, computer-readable media may comprise computer storage media and communication media. Computer storage media includes volatile and non-volatile, removable and non-movable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by a computer.

The modules and databases may include, without limitation, an analysis module 104 which executes an analysis application 116, a messaging storage module ("MSM") 106 which stores messages (e.g., voicemail messages) 118, a messaging management module ("MMM") 108 which hosts business rules 120 and executes a messaging management application 122, a database 110 which stores language models 126, a gateway module ("GW") 112 (if needed for TDM or VoIP conversion), and an authentication, authorization, and account module ("AAA") 114. Each of the modules 104, 106, 108, 112, 114 and the database 110 may be connected to and communicate with each other over a system bus 124. It should be appreciated that, in accordance with another embodiment, the modules 104, 106, 108, 112, 114 may comprise software program modules including routines, programs, components, data structures, and other types of structures that perform particular tasks or implement particular abstract data types. It should be understood that, in accordance with various embodiments, the Service Platform 102 and the aforementioned modules, databases, and applications contained therein may also be incorporated within a TDM/circuit or Session Initiated Protocol ("SIP") based network switch (shown as Service Platform 102A). For example, the Service Platform 102A may include an MSM 106A for storing messages. Alternatively, the aforementioned modules, databases, and applications contained in the Service Platform 102 may also be incorporated as software modules and data stored in a dedicated premise based computing unit 180 in communication with a subscriber telephone 182 (shown as Service Platform 102B) or stored on a personal computer 154 associated with a network subscriber (shown as Service Platform 102C). Thus, it should be understood that although the discussion of the aforementioned modules, databases, and applications in the foregoing description refers to the Service Platform 102, it will be appreciated that the various embodiments disclosed herein may also be implemented on the Service Platforms 102A, 102B, and 102C.

In accordance with various embodiments, the analysis module 104 may be configured to execute the analysis application 116 which may utilize the language models 126 to identify grammar (i.e., words or phrases) in a recorded voicemail message. In accordance with various embodiments, the language models 126 may include, but are not limited to established language models (with phonetic based speech recognition) or language and semantic frame models (with large vocabulary continuous speech recognition). The language models 126 may comprise general language models and/or custom language models for recognition grammar associated with a specific industry such as the financial industry, the medical industry, the telecommunications industry, construction industry, etc.

In accordance with various embodiments, the MSM 106 may be configured to store the recorded messages 118 in a messaging database (not shown). As will be discussed in greater detail with respect to FIGS. 2-3 below, the MSM 106 may further be configured to automatically save the messages 118 for a predetermined period (which may be defined by a subscriber) based on a priority or identified category associated with the high priority voicemail messages may be saved on the MSM 106 for a forty-five or sixty day period. Similarly, a call involving a specific category may be saved on the MSM 106 for a forty-five or sixty day or longer period.

In accordance with various embodiments, the MMM 108 hosts the business rules 120 and the messaging management application 122. The MMM 108 may be configured to execute the messaging management application 122 to record a message (e.g., a voicemail message left for the called party 162 by the calling party 142 (e.g., a caller identification information) or information associated with the called party 162 (i.e., the unavailable called party), associate a language model (e.g., the language models 126) with the message based on the message category, and automatically perform a messaging management function on the message based on the business rules 120. For example, in accordance with one embodiment, the business rules 120 may be utilized by the messaging management application 122 to prioritize messages based on keywords identified by the analysis application 116. In particular, the business rules 120 may stipulate that messages containing certain key words or phrases such as "missed orders," "late orders," "late deliveries," "medical emergency," "missed appointments," etc. be given priority over other words and phrases. It should be understood that the aforementioned list is not exhaustive and that one skilled in the art may configure business rules based on additional key words or phrases.

In accordance with one embodiment, the messaging management function performed by the messaging management application 122 may include automatically prioritizing the message based on the business rules 120, generating a flag for the message based on the message priority, communicating an indicator of the message flag to the unavailable called party, and ranking the message based on the priority. In accordance with another embodiment, the messaging management function performed by the messaging management application 122 may include automatically triggering an action directed to the unavailable called party based on the business rules 120. The triggered action may include, for example, the forwarding of a recorded voicemail message to the called party's personal cellular telephone or the telephone of a colleague of the called party. In accordance with another embodiment, the messaging management function performed by the messaging management application 122 may automatically refine the message's identified category by applying related business rules 120 to manage the stored message. The related management may include, for example, retaining the recorded voicemail message for a longer than a standard period for the determined priority. Another related management function may allow retrieval of a message by its category, it priority and/or its "action." The functionality of the MMM 108 and the messaging management application 122 will be described in greater detail below with respect to FIGS. 2 and 3.

The database 110 stores the business rules 120 utilized by the messaging management application 122 on the MMM 108. The GW 112 may be a conventional gateway for converting TDM signals to User Datagram Protocol/Internet Protocol ("UDP/IP") data in a manner known to those skilled in the art.

Figure 2:
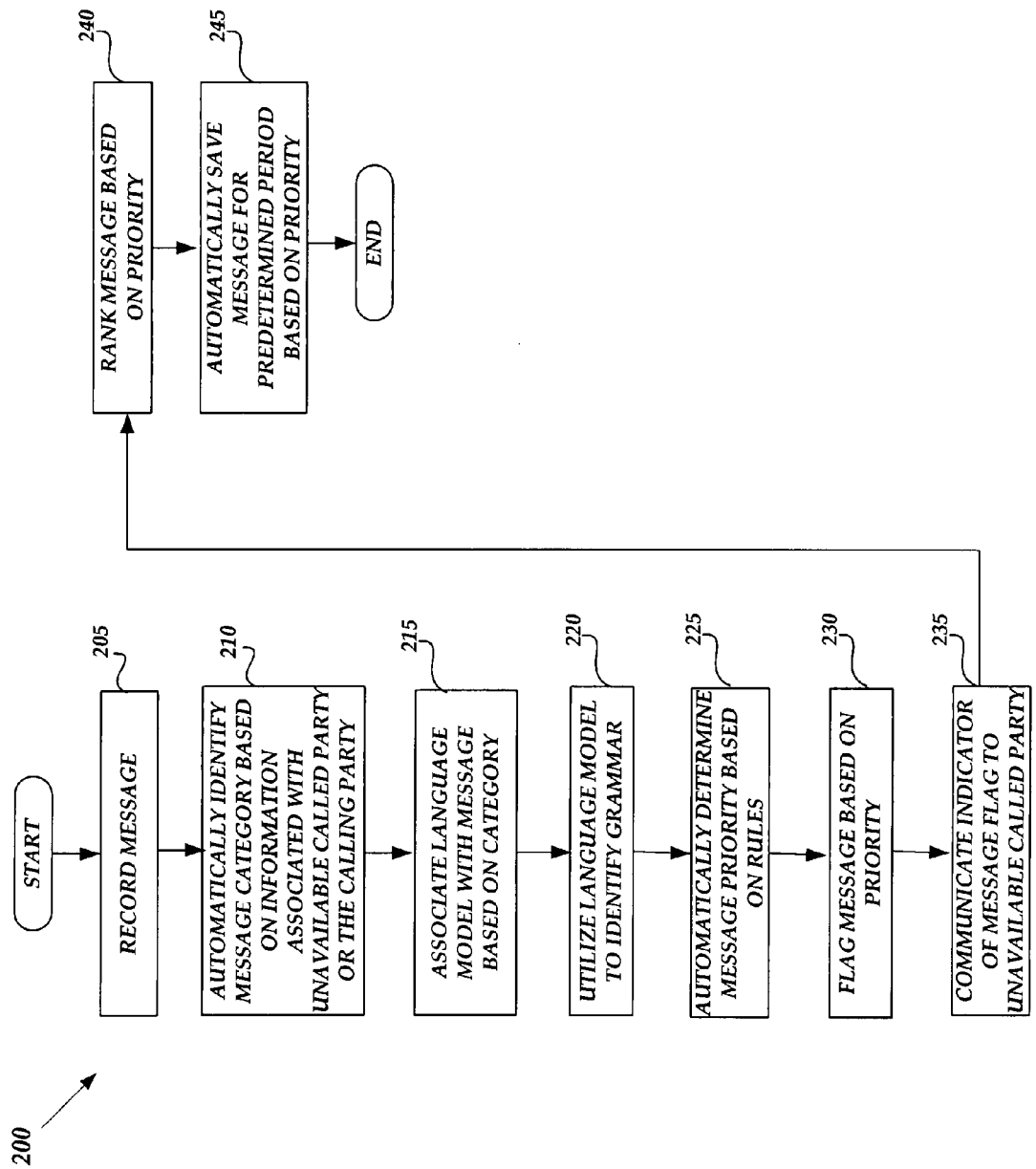
FIG. 2 is a flow diagram illustrating aspects of a process for the utilization of speech analytics for the automatic prioritization of recorded messages in a communications network, in accordance with various embodiments of the invention.

Referring now to FIG. 2, an illustrative routine 200 will be described illustrating a process performed by the Service Platform 102 in the network environment 100 for the utilization of speech analytics to automatically prioritize recorded messages in a communications network, in accordance with various embodiments. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 2-3 and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 200 begins at operation 205, where the messaging management application 122 executing on the MMM 108 records a message (i.e., a voicemail message) which may be left by the calling party 142 in a voicemail box associated with an unavailable called party such as the called party 162 in the called party location 160 in the network environment 100. For example, the message may represent a communication of a missed appointment with the unavailable called party.

From operation 205, the routine 200 continues to operation 210, where the messaging management application 122 automatically identifies a message category for the message based on information associated with the unavailable caller or the calling party. In particular, the messaging management application 122 may retrieve caller identification information via the bridged connection to the telephone call from the calling party to the unavailable called party 162 to determine an identity of the calling party location 140. For example, if the caller identification information associated with the calling party location 140 identifies the call as coming from a sales department of a business organization, the messaging management application 122 may identify a sales category for the message. It should be understood that if the caller identification information associated with the calling party 142 is unavailable or is associated with a residential telephone line, the messaging management application 122 may identify a general category for the message or apply a back-up policy such as time-of-day to categorize the call.

From operation 210, the routine 200 continues to operation 215, where the messaging management application 122 associates a language model 126 with the message based on the category identified at operation 210. For example, if the category identified for the message is a sales category, then the messaging management application 122 may associate a customized language model 126 including grammar utilized by the sales department in a business organization. It will be appreciated that in accordance with various embodiments, if the message is associated with a general category, then a general language model for recognizing grammar used by the general public, for example, may be associated with the message.

From operation 215, the routine 200 continues to operation 220 where the analysis application 116 executing on the application module 104 utilizes the language model 126 associated with the message at operation 215 to identify grammar (i.e., words and/or phrases) and possibly context in the message. The analysis application 116 then sends the identified grammar to the messaging management application 122 for prioritization.

From operation 220, the operation 200 continues to operation 225 where the messaging management application 122 automatically determines a priority may be determined by filtering the grammar identified in the message in real-time utilizing the language model 126 based on the set of business rules 120. For example, if the message is directed to a sales organization and includes grammar such as "missed delivery," the messaging management application 122 may determine that the message is a high priority message if any of the business rules 120 specifies that missed deliveries are a high priority to the sales organization.

From operation 225, the operation 200 continues to operation 230 where the messaging management application 122 flags the message based on the priority assigned at operation 225. In particular, the messaging management application 122 in flagging the message may assign a visual indicator (such as color) or a keyword to the message for communication to a communications device associated with the unavailable called party 162. For example, urgent messages may be assigned the color red or the keyword "urgent" so that the unavailable called party 162, when retrieving messages, is immediately notified of urgent messages. From operation 230, the operation 200 continues to operation 235 where the messaging management application 122 communicates the indicator of the message flag (e.g., the visual indicator or the keyword) to the unavailable called party 162.

From operation 235, the operation 200 continues to operation 240 where the messaging management application 122 ranks the prioritized message with respect to other messages 118 stored for the unavailable called party 162 in the MSM 106. In particular, the messaging management application 122 may assign a high rank to high priority messages 118 and a low rank to messages 118 having a low or no priority. It will be appreciated that the ranking of messages 118 in this manner facilitates the unavailable called party 162 to retrieve high priority messages 118 in a voicemail box regardless of the order the messages 118 were received. Accordingly, the called party when checking for messages may be prompted (if using an audio-only interface) by a summary greeting alerting him to the number of high priority messages followed by other message partitions. The called party may then retrieve the partition of interest as directed by the greeting. If using a visual interface, the called party may see the summary message-writing information reflecting the categories by priority and corresponding messages. The called party may then retrieve the partition and/or message of interest. In one embodiment, the described functionality may reflect an integration between the messaging management application 122, the MSM 106 (or 106A) and a related voicemail platform within the Service Platform 102A (not shown).

From operation 240, the operation 200 continues to operation 245 where the messaging management application 122 instructs the MSM 106 to automatically save the prioritized and ranked message 118 for a predetermined period based on the assigned priority level. For example, the messaging management application 122 may instruct the MSM 106 to retain high priority messages 118 for a longer period than low or no priority messages 118 to increase the number of opportunities for the unavailable party 162 to hear the message 118. It will be appreciated that the messaging management application 122 may be configured with a graphical user interface (not shown) to enable the party 162 to establish the aforementioned periods. It should be appreciated that in accordance with an embodiment, the option for setting a period for retaining messages may include a default setting in which all messages saved for the same period, regardless of priority. The routine 200 then ends.

Figure 3:
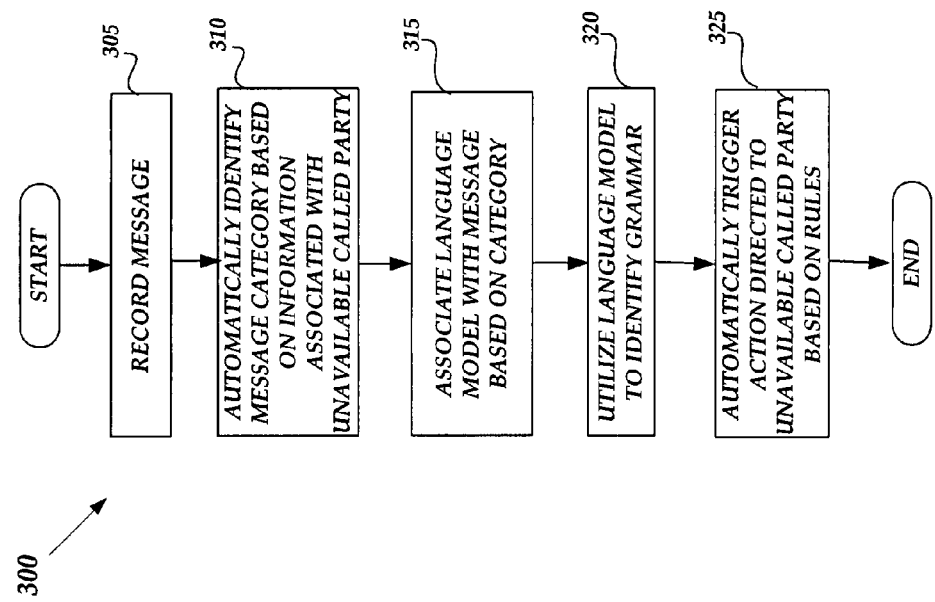
FIG. 3 is a flow diagram illustrating aspects of a process for the utilization of speech analytics for the automatic triggering of an action with respect to recorded messages in a communications network, in accordance with various embodiments of the invention.

Turning now to FIG. 3, an illustrative routine 300 for the utilization of speech analytics to automatically trigger an action with respect to recorded messages in a communications network, will now be described in accordance with various embodiments. The routine 300 begins at operation 305 where the messaging management application 122 executing on the MMM 108 records a message which may be left by the calling party 142 in a voicemail box associated with an unavailable called party such as the called party 162 in the called party location 160 in the network environment 100.

From operation 305, the routine 300 continues to operation 310, where the messaging management application 122 automatically identifies a message category for the message based on information associated with the unavailable caller. From operation 310, the routine 300 continues to operation 315, where the messaging management application 122 associates a language model 126 with the message based on the category identified at operation 310. From operation 315, the routine 300 continues to operation 320 where the analysis application 116 executing on the application module 104 utilizes the language model 126 associated with the message at operation 215 to identify grammar (i.e., words and/or phrases) in the message.

From operation 320, the operation 300 continues to operation 325 where the messaging management application 122 automatically triggers an action directed to the unavailable called party based on the business rules 120. For example, the business rules 120 may specify that voicemail messages left for the unavailable called party should be automatically forwarded to the telephone of a colleague or to an alternate telephone number associated with the called party from which the called party may listen to recorded messages without having to manually retrieve them from a voicemail box. The routine 300 then ends.

It will be apparent by those skilled in the art that various modifications or variations may be made in the present invention without departing from the scope or spirit of the invention. Other embodiments of the present invention will be apparent to those skilled in the art from consideration of the specification and practice of the invention disclosed herein.

I claim:

1. A method comprising:
    recording a message directed to an unavailable party;
    identifying, via a processor, a message category based on rules associated with the unavailable party;
    identifying a language grammar based on the message category; and
    performing an action utilizing the language grammar, wherein the action is based on the rules.

2. The method of claim 1, further comprising:
assigning a message priority to the message based on the message category, wherein the performing of the action is based on the message priority.

3. The method of claim 1, wherein the message is a voicemail message.

4. The method of claim 1, further comprising:
saving the message for a predetermined period based on a priority set by the unavailable party.

5. The method of claim 1, further comprising:
triggering an immediate action to the unavailable party based on the rules associated with the unavailable party.

6. The method of claim 5, wherein triggering an immediate action comprises forwarding the message to a device associated with the unavailable party.

7. The method of claim 5, wherein the rules associated with the unavailable party are associated with location coordinates of a sender of the message.

8. A system comprising:
a processor; and
a computer-readable storage medium having instructions stored which, when executed by the processor, result in the processor performing operations comprising:
recording a message directed to an unavailable party;
identifying a message category based on rules associated with the unavailable party;
identifying a language grammar based on the message category; and
performing an action utilizing the language grammar, wherein the action is based on the rules.

9. The system of claim 8, the computer-readable storage medium having additional instructions stored which, when executed by the processor, result in operations comprising:
assigning a message priority to the message based on the message category, wherein the performing of the action is based on the message priority.

10. The system of claim 8, wherein the message is a voicemail message.

11. The system of claim 8, the computer-readable storage medium having additional instructions stored which, when executed by the processor, result in operations comprising:
saving the message for a predetermined period based on a priority set by the unavailable party.

12. The system of claim 8, the computer-readable storage medium having additional instructions stored which, when executed by the processor, result in operations comprising:
triggering an immediate action to the unavailable party based on the rules associated with the unavailable party.

13. The system of claim 12, wherein triggering an immediate action comprises forwarding the message to a device associated with the unavailable party.

14. The system of claim 12, wherein the rules associated with the unavailable party are associated with location coordinates of a sender of the message.

15. A computer-readable storage device having instructions stored which, when executed by a computing device, result in the computing device performing operations comprising:
recording a message directed to an unavailable party;
identifying a message category based on rules associated with the unavailable party;
identifying a language grammar based on the message category; and
performing an action utilizing the language grammar, wherein the action is based on the rules.

16. The computer-readable storage device of claim 15, having additional instructions stored which, when executed by the computing device, cause the computing device to perform operations comprising:
assigning a message priority to the message based on the message category, wherein the performing of the action is based on the message priority.

17. The computer-readable storage device of claim 15, wherein the message is a voicemail message.

18. The computer-readable storage device of claim 15, having additional instructions stored which, when executed by the computing device, cause the computing device to perform operations comprising:
saving the message for a predetermined period based on a priority set by the unavailable party.

19. The computer-readable storage device of claim 15, having additional instructions stored which, when executed by the computing device, cause the computing device to perform operations comprising:
triggering an immediate action to the unavailable party based on the rules associated with the unavailable party.

20. The computer-readable storage device of claim 19, wherein triggering an immediate action comprises forwarding the message to a device associated with the unavailable party.

* * * * *